(12) United States Patent
Koyama

(10) Patent No.: US 6,750,938 B2
(45) Date of Patent: Jun. 15, 2004

(54) LIQUID CRYSTAL DISPLAY DEVICE AND LIQUID CRYSTAL DISPLAY APPARATUS INCORPORATING THE SAME

(75) Inventor: Yoshihide Koyama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 2 days.

(21) Appl. No.: 10/162,495

(22) Filed: Jun. 4, 2002

(65) Prior Publication Data

US 2003/0071959 A1 Apr. 17, 2003

(30) Foreign Application Priority Data

Jun. 5, 2001 (JP) ........................................ 2001-169167
Mar. 12, 2002 (JP) ........................................ 2002-066704

(51) Int. Cl.$^7$ ............................................ G02F 1/1339
(52) U.S. Cl. .................................... 349/156; 349/152
(58) Field of Search ............................ 349/155, 156, 349/149, 150, 151, 152, 153, 139, 143, 157

(56) References Cited

U.S. PATENT DOCUMENTS

| | | | |
|---|---|---|---|
| 5,917,572 A | * 6/1999 | Kurauchi et al. | 349/156 |
| 5,946,070 A | * 8/1999 | Kohama et al. | 349/156 |
| 5,963,288 A | * 10/1999 | Sato et al. | 349/154 |
| 6,268,898 B1 | * 7/2001 | Ihara | 349/155 |
| 6,373,547 B2 | * 4/2002 | Saito et al. | 349/155 |
| 6,384,882 B1 | * 5/2002 | Nagayama et al. | 349/110 |
| 6,445,437 B1 | * 9/2002 | Miyazaki et al. | 349/156 |
| 6,583,846 B1 | * 6/2003 | Yanagawa et al. | 349/155 |

FOREIGN PATENT DOCUMENTS

| | | |
|---|---|---|
| JP | 06222370 A | 8/1994 |
| JP | 2000298282 A | 10/2000 |

* cited by examiner

*Primary Examiner*—Robert H. Kim
*Assistant Examiner*—David Chung
(74) *Attorney, Agent, or Firm*—William J. Daley, Jr.; Edwards & Angell, LLP

(57) ABSTRACT

A liquid crystal display device includes: a first substrate; a second substrate opposing the first substrate via a large number of columnar spacers therebetween, the columnar spacers being fixed on the first substrate; and a liquid crystal layer provided between the first substrate and the second substrate. The liquid crystal display device has a display area for displaying an image, and a non-display area adjacent to the display area. In the display area of the liquid crystal display device, a plurality of display electrodes that are used when applying a voltage across the liquid crystal layer are provided at an interval on one side of the first substrate that is closer to the liquid crystal layer, whereas in the non-display area, a plurality of peripheral electrodes are provided with substantially no interval therebetween on the side of the first substrate that is closer to the liquid crystal layer. Among the large number of columnar spacers in the liquid crystal display device, the columnar spacers in the display area are provided on the display electrodes while the columnar spacers that define a thickness of the liquid crystal layer in the non-display area are provided on the peripheral electrodes.

17 Claims, 8 Drawing Sheets

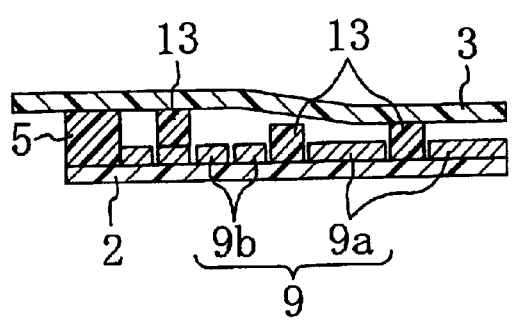
FIG. 6A
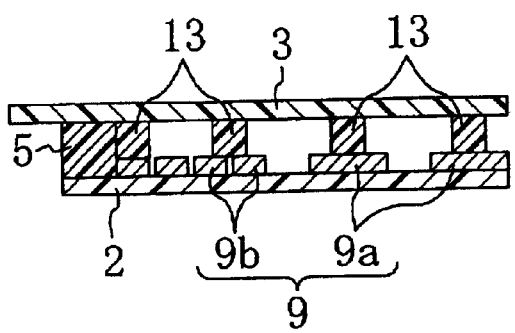
FIG. 6B
FIG. 7
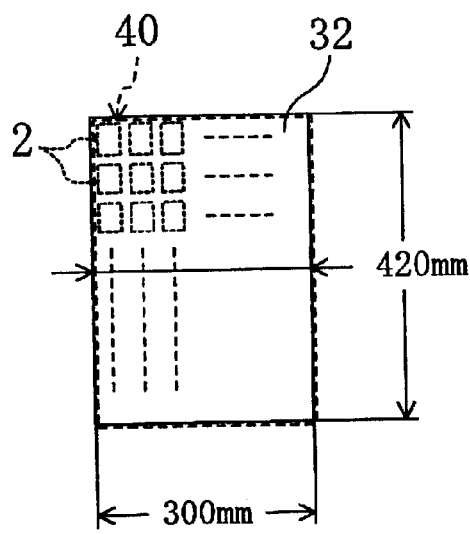
FIG. 8
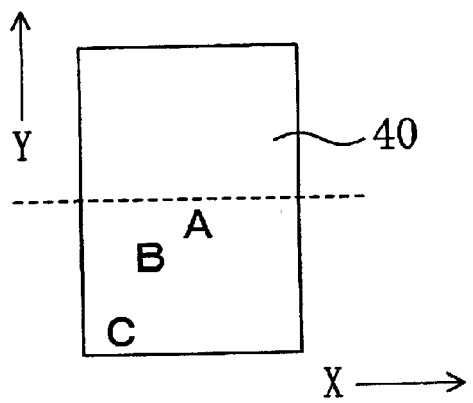

LIQUID CRYSTAL DISPLAY DEVICE AND LIQUID CRYSTAL DISPLAY APPARATUS INCORPORATING THE SAME

BACKGROUND OF THE INVENTION

1. Field of the Invention

The present invention relates to a liquid crystal display device used for displaying characters and images, and a liquid crystal display apparatus incorporating the same.

2. Description of the Background Art

Liquid crystal display apparatuses, being thin and light in weight, are used in a wide variety of applications such as displays for personal digital assistance devices. Such a liquid crystal display apparatus includes a panel-shaped liquid crystal display device and other components.

A passive matrix type liquid crystal display device will now be described with reference to FIG. 10, as an example of a liquid crystal display device.

FIG. 10 schematically illustrates a cross section of a liquid crystal display device 101.

The liquid crystal display device 101 includes a first substrate 102, a second substrate 103 opposing the first substrate 102, and a liquid crystal layer 106 provided between the substrates 102 and 103 that are sealed together along the periphery thereof by a sealant 104 containing spherical beads 104. The liquid crystal display device 101 has a display area in which characters and shapes are displayed, and a non-display area surrounding the display area. In the display area, a plurality of strip-shaped first display electrodes 109a are provided on one side of the first substrate 102 that is closer to the liquid crystal layer 106, and a plurality of strip-shaped second display electrodes 111a are provided on one side of the second substrate 103 that is closer to the liquid crystal layer 106. The first display electrodes 109a extend in a direction vertical to the sheet of the figure and are spaced apart from one another. The second display electrodes 111a extend in the left-right direction in the figure and are spaced apart from one another. A rectangular pixel is defined by these electrodes 109a and 111a at each intersection therebetween, whereby a plurality of such pixels are arranged in a lattice-shaped matrix pattern. In the non-display area, first peripheral electrodes 109b are provided with substantially no interval therebetween on one side of the first substrate 102 that is closer to the liquid crystal layer 106 so as to surround the first display electrodes 109a. The first peripheral electrodes 109b include, for example, wiring electrodes that are connected to the first display electrodes 109a, and dummy electrodes that are provided so that the non-display area is occupied by electrodes as is the display area. First electrodes 109 include the first peripheral electrodes 109b and the first display electrodes 109a in the display area. A first alignment film 110 and a second alignment film 112 for regulating the orientation direction of the liquid crystal molecules are provided respectively on one side of the first display electrodes 109a that is closer to the liquid crystal layer 106 and on one side of the second display electrodes 111a that is closer to the liquid crystal layer 106. For each pixel of the liquid crystal display device 101, the voltage to be applied across the liquid crystal layer 106 between one first display electrode 109a and one second display electrode 111a that define the pixel is controlled so as to change the orientation of the liquid crystal molecules in the liquid crystal layer 106 and to adjust the amount of light to be transmitted therethrough, thus displaying characters and images in the display area.

The display quality of the liquid crystal display device 101 is substantially influenced by variations in the thickness of the liquid crystal layer 106, i.e., variations in the cell gap. As the variations increase, the display quality decreases, causing a display non-uniformity, or the like. Therefore, in order to achieve a good display quality, it is necessary to achieve a uniform cell gap.

In order to address the problem, a large number of spherical spacers are provided between the first and second substrates in the prior art. However, such spherical spacers are easily collapsed by an external force because they support the substrates by point contact, and the particle diameter thereof is in conformity with the normal distribution, whereby it is not possible to achieve a highly uniform cell gap with such spherical spacers. Moreover, spherical spacers have small contact areas with the substrates because they support the substrates by point contact as described above. Therefore, even if the spherical spacers are fixed by providing a fixing layer or an attachment layer, they are moved in the liquid crystal layer by an external force such as a vibration or a shock applied thereto, thereby causing a change in the spacer distribution, which in turn influences the cell gap variations.

In view of this, a different type of liquid crystal display device has been proposed and put into practical use, in which a large number of columnar spacers are provided so as to be spaced apart from one another between the opposing surfaces of the first substrate and the second substrate.

For example, Japanese Laid-Open Patent Publication No. 6-222370 discloses a method for fixing columnar spacers along gaps in a transparent electrode by forming a transparent electrode pattern on a surface of a substrate by using a photoresist, baking the photoresist remaining on the pattern to convert it into a lift-off mask, forming a photosensitive film having a predetermined thickness on the surface of the substrate, exposing and developing the photosensitive film from the reverse surface of the substrate via the lift-off mask so as to form the columnar spacers that are aligned with the gaps in the transparent electrode pattern.

Moreover, Japanese Laid-Open Patent Publication No. 2000-298282 discloses a liquid crystal display apparatus including a pair of substrates with a liquid crystal layer being interposed therebetween, a first electrode provided on one of the substrates in a pixel region, a second electrode provided on the other substrate in a pixel region, and a columnar spacer provided on one of the substrates in the pixel region, the columnar spacer being covered by one of the first and second electrodes that is provided on the one of the substrates. Japanese Laid-Open Patent Publication No. 2000-298282 discloses that with such a configuration, the direction of an electric field produced between a portion of the electrode that is formed on the side surface of the columnar spacer and the other electrode is different from that of an electric field produced between another portion of the electrode and the other electrode, thereby providing a so-called "multi-domain" effect in this area.

Such columnar spacers are formed by applying and pre-baking a material obtained by adding a photosensitizer to an acrylic resin liquid, or the like, on the first substrate on which an electrode pattern has been formed, subjecting the material to a UV exposure/development process using a photomask, and then baking the material.

The cell gap uniformity is required not only in the display area in which characters and images are displayed, but also in the non-display area surrounding the display area, because it substantially influences the display quality in the peripheral portion of the display area. Particularly, in an STN (Super Twisted Nematic) liquid crystal display device, in which an image is displayed by controlling not only the optical rotatory of the liquid crystal material but also the birefringence thereof, the retardation is sensitive to variations in the cell gap, thereby imposing very high requirements as to the uniformity of the cell gap in the display area and in the non-display area. Liquid crystal display devices using ferroelectric liquid crystal materials also impose such high requirements because of their very small cell gaps. In order to address such requirements, columnar spacers are usually provided not only in the display area but also in the non-display area.

However, the provision of columnar spacers has the following problems.

Typically, columnar spacers are provided in the display area in a pattern such that the columnar spacers are placed within the gaps between display electrodes on the first substrate in order to increase the pixel aperture ratio and thus to improve the optical characteristics such as the brightness and the contrast, and the columnar spacers are formed in the non-display area in the same pattern as in the display area for ease of the manufacturing process. However, in the non-display area, the peripheral electrodes such as the wiring electrodes and the dummy electrodes are provided in a complicated pattern with substantially no interval therebetween, whereby not a few of the columnar spacers are formed on the peripheral electrodes. As described above, when forming the columnar spacers, a resin liquid is applied on the first substrate on which the first electrodes have been formed. In this process, there occurs a difference of about 1500 to 2000 Å between the height of the top surface position of a resin layer 131 in a portion where the first electrode 109 is present and that in another portion where the first electrode 109 is absent, as illustrated in FIG. 11A (in FIG. 11A to FIG. 11C, the same reference numerals are used to denote the same elements as those in FIG. 10). Therefore, the position of the top surface of a columnar spacer 113 formed within a gap between the first display electrodes 109a in the display area is lower than that of another columnar spacer 113 formed on a peripheral electrode in the non-display area, as illustrated in FIG. 11B. As a result, the cell gap in the display area is different from that in the non-display area, as illustrated in FIG. 11C, thereby causing a display non-uniformity in the peripheral portion of the display area and thus decreasing the display quality.

Assumedly, this problem can be addressed by arranging each columnar spacer within a gap between the peripheral electrodes also in the non-display area. However, since the gap is much narrower than that in the display area, only small-sized columnar spacers can be provided, and such small-sized columnar spacers may possibly be damaged during an alignment film rubbing treatment. Moreover, it is difficult to realize such a process that is capable of forming columnar spacers precisely within such small gaps. In addition, the arrangement density, the size and the shape of the columnar spacers are restricted by the size and the application of the liquid crystal display device.

SUMMARY OF THE INVENTION

An object of the present invention is to provide a liquid crystal display device having a very good cell gap uniformity in a boundary region between a display area and a non-display area, and a liquid crystal display apparatus incorporating the same. In the present invention, columnar spacers that define the thickness of a liquid crystal layer, i.e., the cell gap, are provided on electrodes both in the display area and in the non-display area. Therefore, unlike in a case where columnar spacers are provided within inter-electrode gaps in the display area, there is substantially no difference in the height of the top surface position of the spacers between the display area and the non-display area, thus realizing a very good cell gap uniformity in the boundary region.

Specifically, a liquid crystal display device of the present invention includes: a first substrate; a second substrate opposing the first substrate via a large number of columnar spacers therebetween, the columnar spacers being fixed on the first substrate; and a liquid crystal layer provided between the first substrate and the second substrate, wherein: the liquid crystal display device has a display area for displaying an image, and a non-display area adjacent to the display area; in the display area, a plurality of display electrodes that are used when applying a voltage across the liquid crystal layer are provided at an interval on one side of the first substrate that is closer to the liquid crystal layer; in the non-display area, a plurality of peripheral electrodes are provided with substantially no interval therebetween on the side of the first substrate that is closer to the liquid crystal layer; and among the large number of columnar spacers, the columnar spacers in the display area are provided on the display electrodes while the columnar spacers that define a thickness of the liquid crystal layer in the non-display area are provided on the peripheral electrodes.

Herein, the peripheral electrodes provided on the first substrate in the non-display area include wiring electrodes that are connected to the display electrodes, and dummy electrodes that are provided so that the non-display area is occupied by electrodes as is the display area. All of the columnar spacers provided in the non-display area may be intentionally provided on the peripheral electrodes. Alternatively, the columnar spacers may be provided so that some of the columnar spacers are placed on the peripheral electrodes and thus define the cell gap, while the other columnar spacers are placed not on the peripheral electrodes but within inter-electrode gaps and thus are not involved in defining the cell gap, as in a case where the columnar spacers are provided in a predetermined pattern in the non-display area.

The cell gap is influenced by the substrate contact area and the arrangement density per unit area of the columnar spacers. For example, the cell gap tends to increase as the substrate contact area per unit area of the columnar spacers increases or as the arrangement density thereof increases. Thus, the cell gap may be varied by variations in the size of the columnar spacers or the arrangement density thereof Therefore, in the liquid crystal display device of the present invention, it is preferred that the large number of columnar spacers on the first substrate are all of the same size and are arranged in a uniform pattern across the entire area including the display area and the non-display area. In this way, it is not necessary to form, in separate processes, different types of columnar spacers in the display area and in the non-display area, and the columnar spacers of the same shape can be formed simultaneously in a uniform pattern across the entire area including the display area and the non-display area, thereby providing the following advantages: (a) the number of process steps for forming the columnar spacers is reduced, thus improving the productivity; (b) only one process is required for forming the columnar spacers, thereby suppressing the deterioration of the first substrate due to the process; and (c) the amount of material to be consumed for forming the columnar spacers is reduced, thereby reducing the cost. Herein, "all of the same size" means that the variations in the cross-sectional area (contact area with electrodes) of the columnar spacers are ±20% or less, and "uniform pattern" means that the variations in the arrangement interval are ±20% or less. Thus, the size and the arrangement pattern of the columnar spacers can be designed so as to fall within such value ranges. The columnar spacers can be designed by blocks, i.e., separately for the display area and for the non-display area, in which case the design of the columnar spacers can be facilitated and standardized.

Typically, in the display area, all the columnar spacers are interposed between the display electrodes on the first substrate and the display electrodes on the second substrate (hereinafter expressed as "interposed between upper and lower electrodes"). In the non-display area, however, the peripheral electrodes are not necessarily arranged regularly, and the peripheral electrodes may be extraction electrodes that are arranged in a bent pattern or dummy electrodes whose width is smaller than that of the display electrodes, whereby it is very difficult for all the columnar spacers in the non-display area to be interposed between the upper and lower electrodes. However, it can be inferred from the experiments described later (see TABLE 10) that as long as 40% or more of the columnar spacers in the non-display area are interposed between the peripheral electrodes on the first substrate and second peripheral electrodes on the second substrate, the cell gap can be effectively defined by those columnar spacers. Therefore, in the liquid crystal display device of the present invention, in a case where the columnar spacers are all of the same size and are arranged in a uniform pattern, it is preferred that: second peripheral electrodes are provided on one side of the second substrate that is closer to the liquid crystal layer; and 40% or more of the columnar spacers in the non-display area are interposed between the peripheral electrodes on the first substrate and the second peripheral electrodes on the second substrate. Note that where columnar spacers are provided so as to be placed within inter-electrode gaps in the display area, as in the prior art, the columnar spacers that are interposed between the upper and lower electrodes in the non-display area will protrude and thus disturb the cell gap. In contrast, in the present invention, the cell gap is defined by those columnar spacers that are interposed between the upper and lower electrodes, whereby even if there are columnar spacers that are not interposed between the upper and lower electrodes, they do not influence the cell gap.

If the minimum outside diameter of the columnar spacers is smaller than 6 μm, the columnar spacers may be damaged during the alignment film rubbing treatment. If the minimum outside diameter is greater than 50 μm, the alignment film rubbing treatment may be insufficient, particularly in an area around the base of each columnar spacer, by being hindered by the presence of the columnar spacers, thereby causing a display non-uniformity, roughness, etc., resulting in a poor display quality. Therefore, in the liquid crystal display device of the present invention, in a case where the columnar spacers are all of the same size and are arranged in a uniform pattern, it is preferred that the minimum outside diameter of the columnar spacers is 6 to 50 μm. Herein, the minimum outside diameter of a columnar spacer is, for example, the diameter of the columnar spacer if the spacer cross section is circular, or the length of each side of the spacer cross section if the cross section is square-shaped.

In a case where the columnar spacers are arranged in a uniform pattern across the entire area including the display area and the non-display area, the columnar spacers can be placed on the peripheral electrodes with a high probability in areas where the inter-electrode interval is smaller than 15 μm, whereby it is possible to achieve a uniform cell gap in the boundary region between the display area and the non-display area. Therefore, in the liquid crystal display device of the present invention, in a case where the columnar spacers are all of the same size and are arranged in a uniform pattern, it is preferred that the peripheral electrodes have areas where an inter-electrode interval therebetween is smaller than 15 μm.

If the non-display area is provided so as to surround the display area, and the peripheral electrodes (extraction electrodes, dummy electrodes, etc.) are provided in the non-display area so as to surround the display electrodes in the display area, it is possible to design a liquid crystal display device having a uniform cell gap with a simple design by providing the columnar spacers of the same size and arranging them in a uniform pattern in the display area and the non-display area. Therefore, in the liquid crystal display device of the present invention, in a case where the columnar spacers are all of the same size and are arranged in a uniform pattern, it is preferred that the non-display area is provided so as to surround the display area, and the plurality of peripheral electrodes in the non-display area are provided so as to surround the display electrodes in the display area.

A substrate made of plastic expands and contracts due to a temperature change by a greater amount as compared to a substrate made of glass, whereby the positions of columnar spacers formed on a substrate can be easily shifted. Therefore, in a case where the columnar spacers are placed within the inter-electrode gaps in the display area, there is required a precisely-controlled process. However, in the present invention where the columnar spacers are placed on electrodes that occupy significantly greater areas, such a precisely-controlled process is not necessary for forming the columnar spacers. Thus, the liquid crystal display device of the present invention is suitable for cases where the first substrate is made of a plastic.

Display electrodes that are formed by a sputtering method, or the like, have minute irregularities present on the surface thereof, whereby the fixing of the columnar spacers on the electrodes is strengthened due to, for example, the increased contact area therebetween as compared to that in a case where the columnar spacers are fixed on the surface of a flat first substrate made of glass, or the like. Therefore, in the liquid crystal display device of the present invention, it is preferred that the columnar spacers in the display area are directly fixed on the display electrodes, and the columnar spacers in the non-display area are directly fixed on the peripheral electrodes.

An STN liquid crystal display device displays an image by controlling not only the optical rotatory of the liquid crystal material but also the birefringence thereof, whereby the retardation is sensitive to variations in the cell gap. Therefore, the liquid crystal display device of the present invention is particularly advantageous when the display mode is an STN mode.

The liquid crystal display device of the present invention, when incorporated together with other components, provides a liquid crystal display apparatus having a good display quality even in the peripheral portion of the display area.

Further objects, features and advantages of the present invention will become apparent from the following description with reference to the accompanying drawings.

BRIEF DESCRIPTION OF THE DRAWINGS

FIG. 6A is a cross-sectional view illustrating a liquid crystal display device in which columnar spacers are placed between display electrodes in the display area.

FIG. 6B is a cross-sectional view illustrating a liquid crystal display device in which columnar spacers are placed on display electrodes in the display area.

FIG. 7 is a diagram illustrating the alignment between a mother substrate and a photomask in the process of forming columnar spacers.

FIG. 8 is a diagram illustrating measurement points at which the expansion of a mother substrate made of plastic is measured.

DETAILED DESCRIPTION OF THE PREFERRED EMBODIMENT

An embodiment of the present invention will now be described with reference to the drawings.

Figure 1:
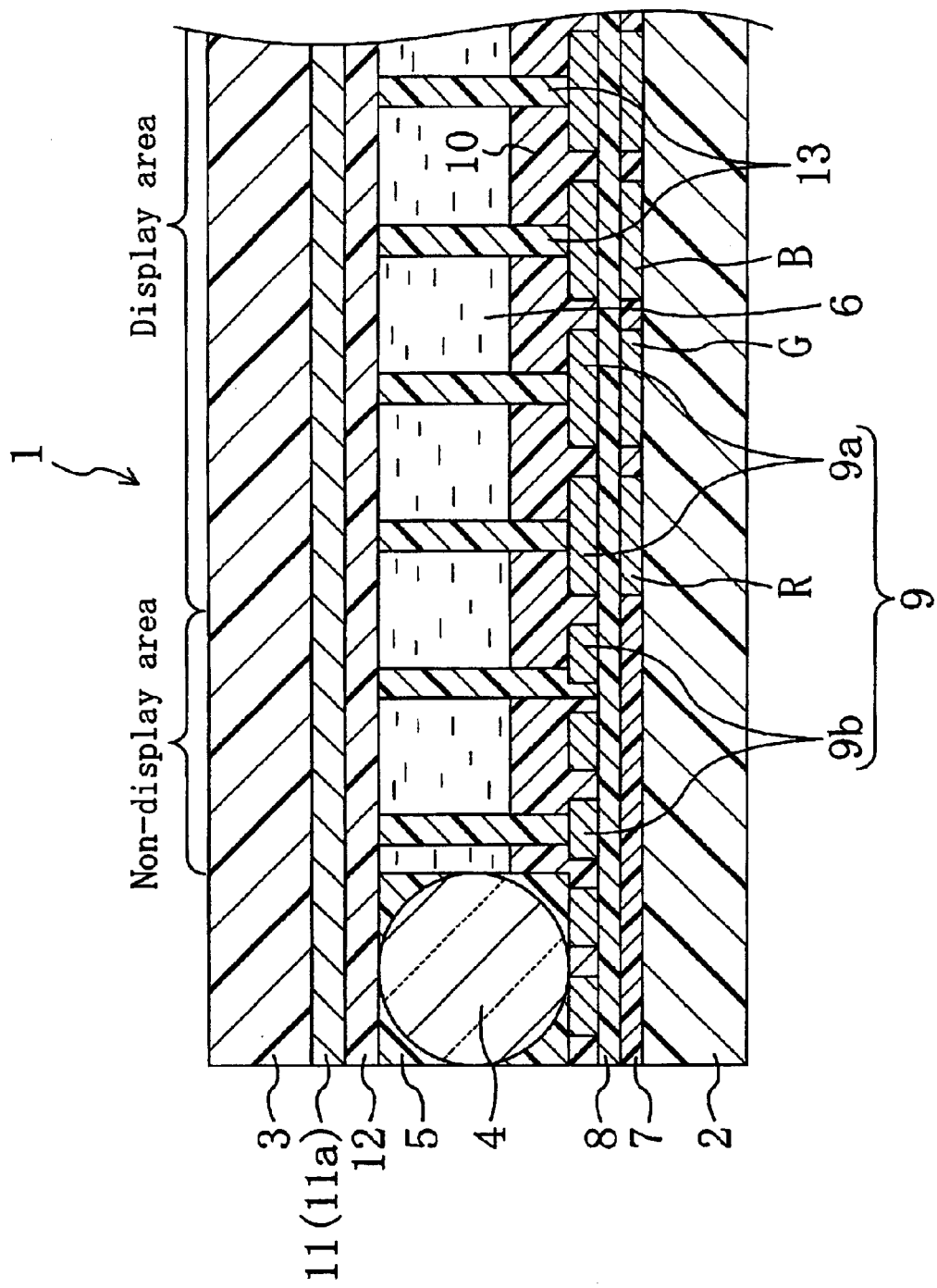
FIG. 1 is a schematic cross-sectional view illustrating a liquid crystal display device according to an embodiment of the present invention.

FIG. 1 schematically illustrates a cross section of an STN liquid crystal display device 1 according to the embodiment of the present invention.

The liquid crystal display device 1 includes a first substrate 2, a second substrate 3 opposing the first substrate 2, and a liquid crystal layer 6 provided between the substrates 2 and 3 that are sealed together along the periphery thereof by a sealant 5 containing spherical beads 4. The liquid crystal display device 1 has a display area in which characters and shapes are displayed, and a non-display area surrounding the display area.

A color filter 7, an overcoat 8, first electrodes 9 and a first alignment film 10 are layered in this order on one side of the first substrate 2 that is closer to the liquid crystal layer 6. Second electrodes 11 and a second alignment film 12 are layered in this order on one side of the second substrate 3 that is closer to the liquid crystal layer 6. A large number of columnar spacers 13 are provided between the first substrate 2 and the second substrate 3. Moreover, a phase plate (not shown) and a first polarizer (not shown) that compensate for the birefringence of the liquid crystal material are layered in this order on the outer side of the first substrate 2. A second polarizer (not shown) is layered on the outer side of the second substrate 3.

The first and second substrates 2 and 3 are each made of a plastic film. The sealant 5 for sealing the opposing substrates together along the periphery thereof is provided on the first substrate 2 by a method known in the art such as a screen printing method, a dispenser method, etc., and is made of a material obtained by adding the spherical beads 4 to a thermosetting epoxy resin. The liquid crystal layer 6 is obtained by injecting, into the gap between the substrates 2 and 3, an STN liquid crystal material that has a sharp transmittance-voltage characteristic and has a large elastic constant ratio. In the absence of an applied voltage, the orientation of the liquid crystal molecules in the liquid crystal layer 6 changes in a spiral pattern in the thickness direction of the liquid crystal layer 6 with a total twist angle of 180° to 270°. In the presence of a voltage applied in the thickness direction of the liquid crystal layer 6, the orientation of the liquid crystal molecules changes according to the level of the voltage so as to adjust the amount of light to be transmitted through the liquid crystal display device 1, thereby displaying characters and images in the display area.

Figure 9:
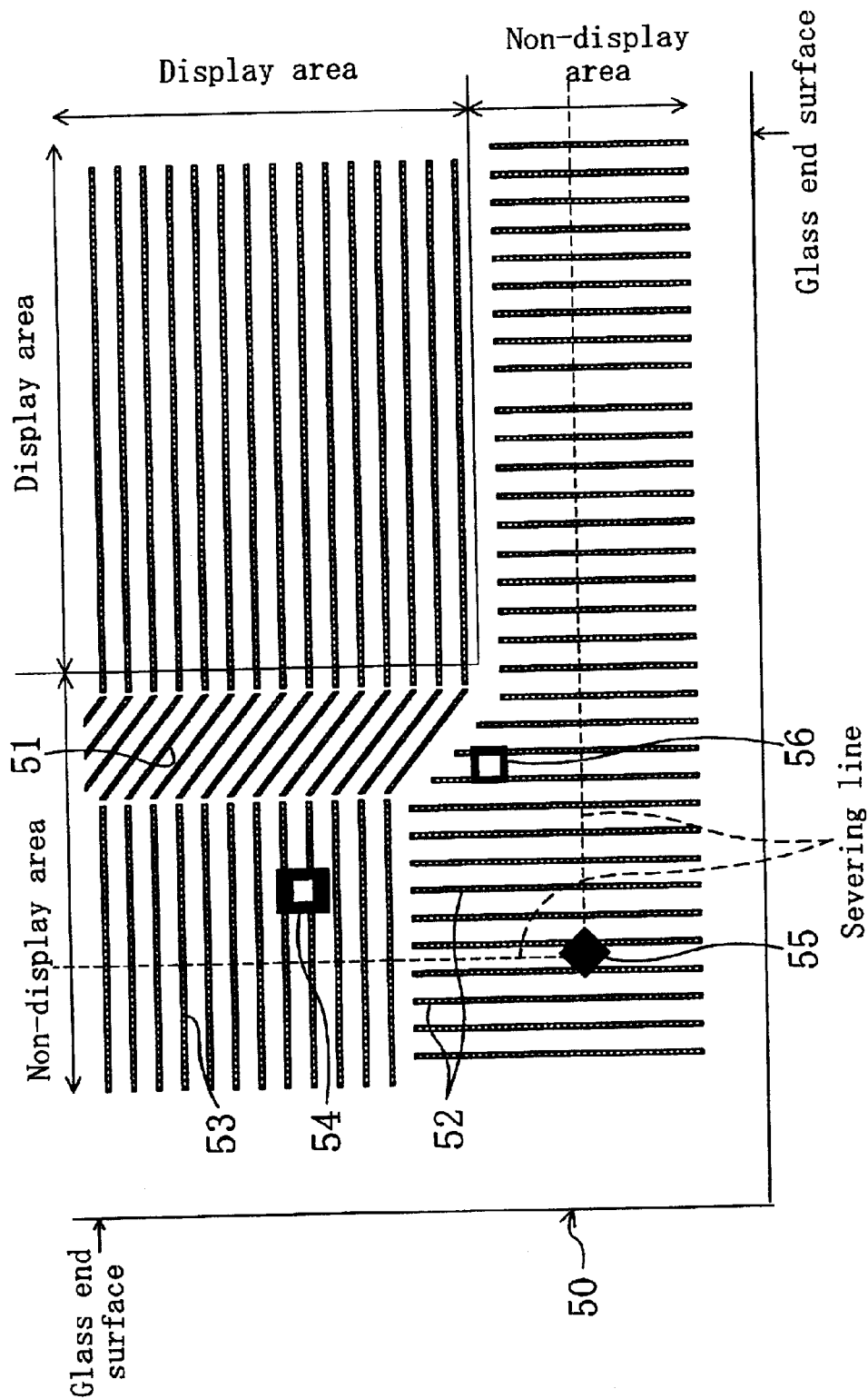
FIG. 9 is a plan view illustrating an original substrate before it is made into a first substrate.
Figure 10:
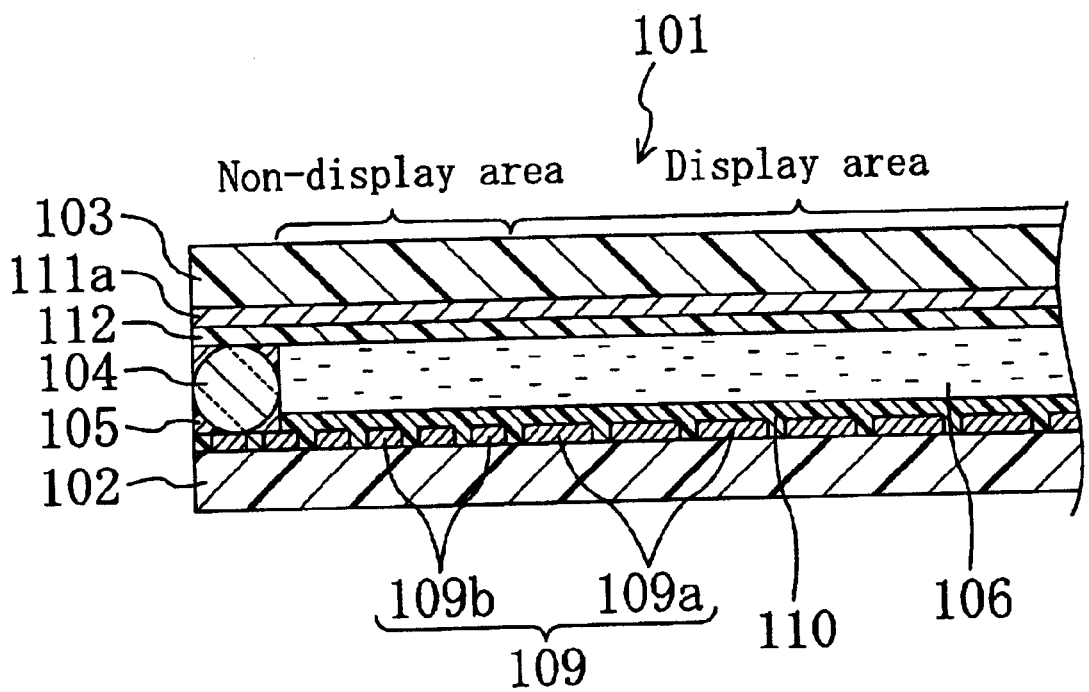
FIG. 10 is a schematic cross-sectional view illustrating a typical liquid crystal display device.
Figure 11A:
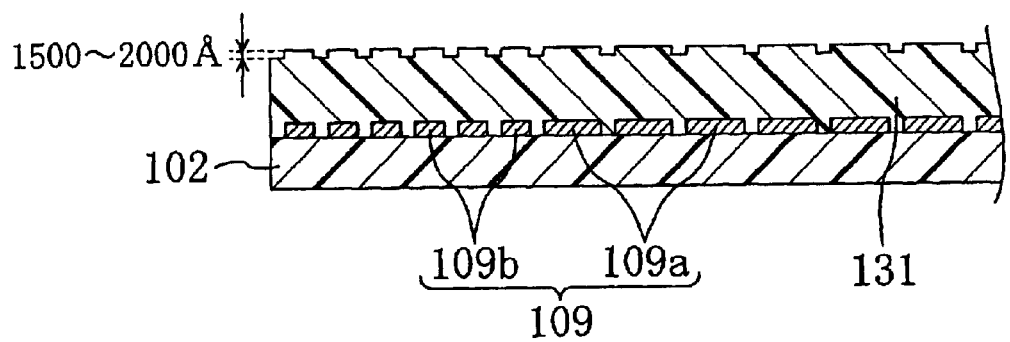
FIG. 11A, FIG. 11B and FIG. 11C are cross-sectional views illustrating a conventional process of forming columnar spacers.
Figure 11B:
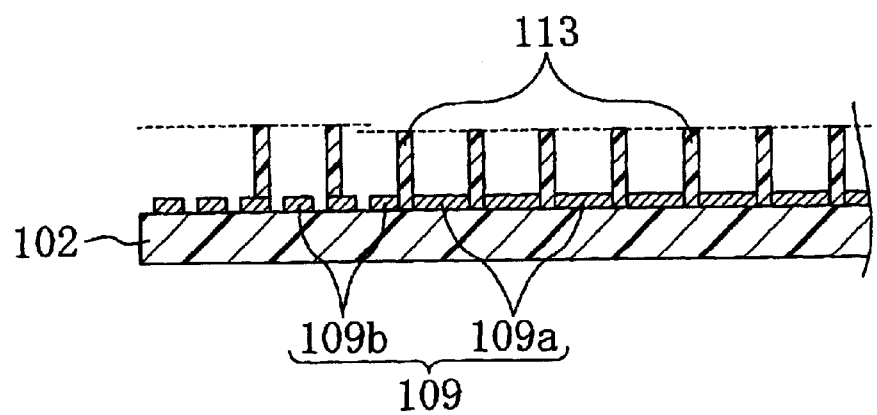
Figure 11C:
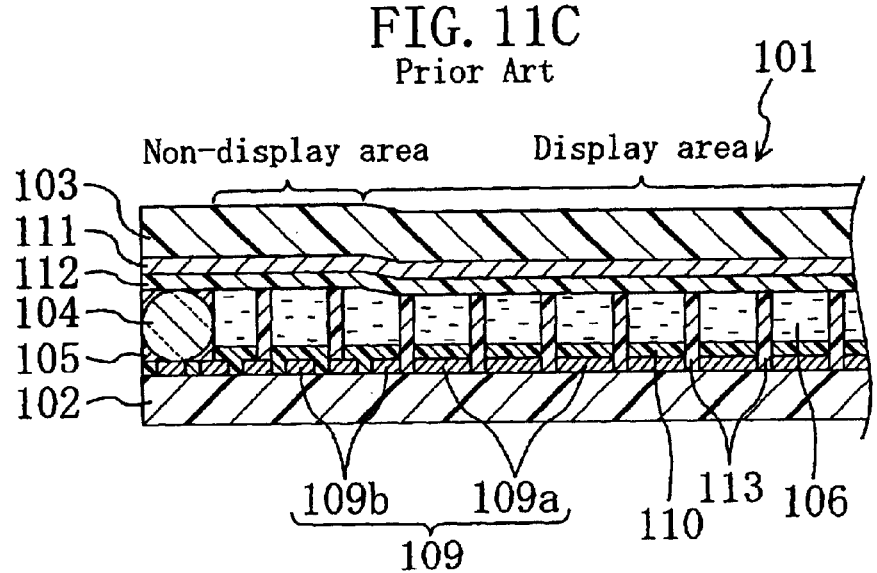

The first electrodes 9 are made of ITO (Indium Tin Oxide), and include a plurality of first display electrodes 9a, 9a, . . . , provided in the display area, and a plurality of first peripheral electrodes 9b, 9b, . . . , provided in the non-display area. The first display electrodes 9a are strip-shaped transparent electrodes extending parallel to one another in a direction vertical to the sheet of the figure and arranged at a constant interval with respect to one another. The first peripheral electrodes 9b are provided so as to surround the first display electrodes 9a and include, for example, wiring electrodes that are connected to the first display electrodes 9a, and dummy electrodes that are provided so that the non-display area is occupied by electrodes as is the display area. FIG. 9 illustrates an original substrate 50 (before it is made into the first substrate 2 by cutting off a peripheral portion thereof). As illustrated in FIG. 9, the first peripheral electrodes 9b of the liquid crystal display device 1 actually include functional electrodes (external circuit connection electrodes 53, an external circuit positioning mark 54, a severing mark 55, an alignment mark 56, etc.) in addition to display extraction electrodes 51 and dummy electrodes 52. In the non-display area, the first peripheral electrodes 9b are provided with substantially no interval therebetween, and there are areas where the inter-electrode interval is smaller than 15 μm. The first electrodes 9 are formed by a method known in the art such as a sputtering method, an ion plating method, or a vacuum evaporation method (electron beam method).

The second electrodes 11 are made of ITO, and include a plurality of second display electrodes 11a provided in the display area, and a plurality of second peripheral electrodes provided in the non-display area. The second display electrodes 11a are strip-shaped transparent electrodes extending parallel to one another in the left-right direction in the figure (a direction perpendicular to the direction in which the first display electrodes 9a extend) and arranged at a constant interval with respect to one another. The second peripheral electrodes are provided so as to surround the second display electrodes 11a and arranged at a constant interval with respect to one another. The second peripheral electrodes include, for example, wiring electrodes that are connected to the second display electrodes 11a, and dummy electrodes. The second electrodes 11 are formed by a method as that used for the first electrodes 9.

Figure 2:
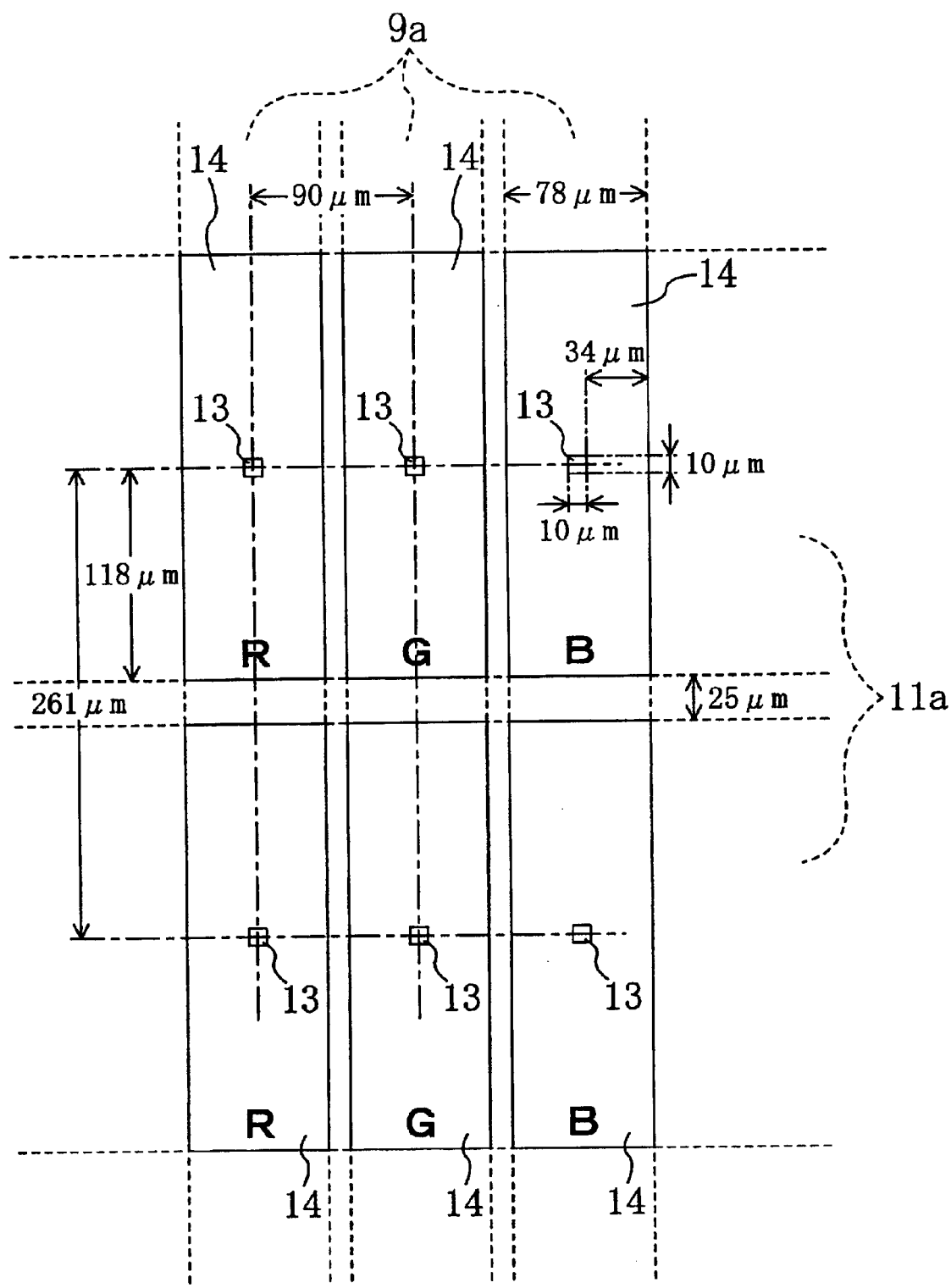
FIG. 2 is a schematic plan view illustrating an example of the liquid crystal display device according to the embodiment of the present invention.

In the display area, a pixel 14 is defined by the first display electrode 9a and the second display electrode 11a at each intersection therebetween, whereby a plurality of such pixels 14, 14, . . . , are arranged in a lattice-shaped matrix pattern. For example, in the example illustrated in FIG. 2, the first display electrodes 9a each have a width of 78 µm and are arranged at an interval of 12 µm, whereas the second display electrodes 11a each have a width of 236 µm and are arranged at an interval of 25 µm. Therefore, the pixels 14 defined by these electrodes 9a and 11a each have a rectangular shape with a long side of 236 µm and a short side of 78 µm. The pixels 14 are arranged in a matrix pattern at a pitch of 261 µm (236 µm+25 µm) in the direction in which the first display electrode 9a extends and at a pitch of 90 µm (78 µm+12 µm) in the direction in which the second display electrode 11a extends. The color filter 7 is divided into sections each corresponding to one of the pixels 14 arranged in the matrix pattern, and the sections are colored in a repeated sequence of red (R), green (G) and blue (B) in the direction in which the second display electrode 11a extends (in the left-right direction in the figure), thereby allowing for a color display. Note that the overcoat 8 is provided for flattening the surface on which the first electrodes 9 are formed and for the function of protecting the color filter 7 during a subsequent process such as an electrode formation process.

The first and second alignment films 10 and 12, each being a resin film made of polyimide, or the like, which has been subjected to a rubbing treatment, are in direct contact with the liquid crystal layer 6 for regulating the orientation direction of the liquid crystal molecules. The first and second alignment films 10 and 12 are made by performing a rubbing treatment on a resin film that has been formed by a screen printing method, or the like.

The columnar spacers 13 each have a square-shaped cross section each side of which is 6 to 50 µm long. In the display area, the columnar spacers 13 are arranged in a pattern such that one columnar spacer 13 is located at the center of each pixel 14. In the non-display area, the columnar spacers 13 are arranged in the same pattern continuing from the display area. Specifically, the columnar spacers 13 are all of the same size (variations in cross-sectional area: ±20% or less), and are provided on the first substrate 2 in a uniform pattern across the entire area including the display area and the non-display area (variations in arrangement interval: ±20% or less). For example, in the example illustrated in FIG. 2, the columnar spacers 13 each have a square-shaped cross section each side of which is 10 µm long, and are arranged at a pitch of 261 µm in the direction in which the first display electrode 9a extends and at a pitch of 90 µm in the direction in which the second display electrode 11a extends so that one columnar spacer 13 is located at the center of each pixel 14.

Thus, in the display area, the cell gap is defined by the columnar spacers 13 provided on the first display electrodes 9a, whereas in the non-display area, many of the columnar spacers 13 (40% or more of all the columnar spacers 13 in the non-display area) are provided on the first peripheral electrodes 9b since the minimum outside diameter (length of each side) of the columnar spacers 13 is 6 to 50 µm and there are areas where the interval between the first peripheral electrodes 9b is smaller than 15 µm, whereby the cell gap is defined by the columnar spacers 13 that are on the first peripheral electrodes 9b. The columnar spacers 13 in the display area are directly fixed to the first display electrodes 9a, and the columnar spacers 13 on the first peripheral electrodes 9b in the non-display area are also directly fixed on the first peripheral electrodes 9b. Furthermore, the surface of each columnar spacer 13 is covered by the first alignment film 10.

Thus, in the liquid crystal display device 1, the columnar spacers 13 defining the cell gap are provided on the electrodes both in the display area and in the non-display area. Therefore, unlike in a case where the columnar spacers 13 are provided within inter-electrode gaps in the display area, there is substantially no difference in the height of the top surface position of the spacers between the display area and the non-display area. As a result, it is possible to obtain a good uniformity in the thickness of the liquid crystal layer 6, i.e., the cell gap, in the boundary region between the display area and the non-display area, thereby obtaining a very good display quality in the peripheral portion of the display area. In addition, since the display mode is an STN mode, in which an image is displayed by controlling not only the optical rotatory of the liquid crystal material but also the birefringence thereof, and thus the retardation is sensitive to variations in the cell gap, this effect is quite significant.

Moreover, the cell gap is influenced by the substrate contact area and the arrangement density per unit area of the columnar spacers. For example, the cell gap tends to increase as the substrate contact area per unit area of the columnar spacers increases or as the arrangement density thereof increases. However, in the liquid crystal display device 1, the columnar spacers 13 are all of the same size and are provided in a uniform pattern across the entire area including the display area and the non-display area, whereby the cell gap is not varied by the variations in the size of the columnar spacers 13 or the variations in the arrangement density thereof In an actual liquid crystal display device 1, the functional electrodes, etc., provided on the first and second substrates 2 and 3 (see FIG. 9) occupy greater areas than the other surrounding electrodes (a functional electrode is as large as about 1 mm by 1 mm). In such an area, the arrangement density of the columnar spacers 13 (the number of columnar spacers per unit area provided on the electrodes of both substrates) will be different from that in other areas. In view of the entire area, however, it is only such an area where the arrangement density increases, and it does not substantially influence the display. Nevertheless, it is preferred to more actively increase the uniformity of the cell gap by making the arrangement density of the columnar spacers more uniform by, for example, removing an inside portion of a functional electrode (e.g., the alignment mark 56 in FIG. 9) so that the area occupied by the functional electrode is brought closer to that of the other surrounding electrodes.

Furthermore, the non-display area is provided so as to surround the display area, and the first and second peripheral electrodes (extraction electrodes, dummy electrodes, etc.) 9b are provided in the non-display area so as to surround the first and second display electrodes 9a and 11a in the display area, whereby the liquid crystal display device 1 having a uniform cell gap can be obtained by a simple design by providing the columnar spacers 13 of the same size in a uniform pattern both in the display area and in the non-display area.

Moreover, since the minimum outside diameter of the columnar spacers 13 is 6 to 50 µm, it is possible to avoid problems such as a damage on the columnar spacers 13 during a rubbing treatment on the first alignment film 10 or an insufficient rubbing treatment due to the presence of the columnar spacers 13.

In addition, minute irregularities are present on the surface of the first display electrodes 9a and the first peripheral electrodes 9b, which are formed by a sputtering method, or the like, whereby if the columnar spacers 13 are directly fixed on the electrodes, the fixing of the columnar spacers 13 on the electrodes is strengthened due to, for example, the increased contact area therebetween as compared to that in a case where the columnar spacers 13 are fixed on the flat surface of the first substrate 2 or the overcoat 8.

Moreover, the surface of the columnar spacers 13 is covered by the first alignment film 10, thereby preventing the contrast from decreasing due to light leakage through portions around the spacers.

Next, a method for forming the columnar spacers 13 of the liquid crystal display device 1 will be described with reference to FIG. 3A to FIG. 3E. Note that in FIG. 3A to FIG. 3E, the same reference numerals are used to denote the same elements as those in FIG. 1.

Figure 3D:
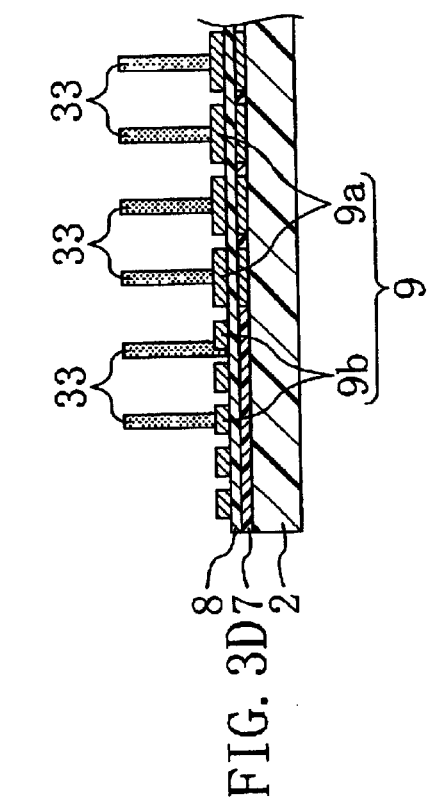
FIG. 3A, FIG. 3B, FIG. 3C, FIG. 3D and FIG. 3E are cross-sectional views illustrating a process of forming columnar spacers of the liquid crystal display device according to the embodiment of the present invention.
Figure 3E:
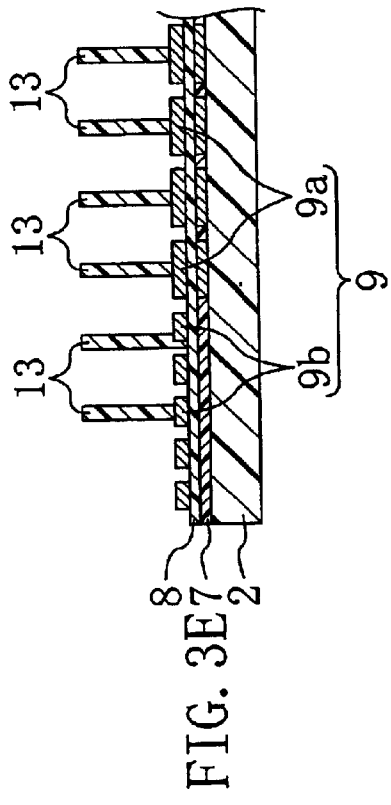
Figure 3A:

First, the color filter 7, the overcoat 8 and the first electrodes 9 (9a, 9b) are provided on the first substrate 2, as illustrated in FIG. 3A.

Figure 3B:
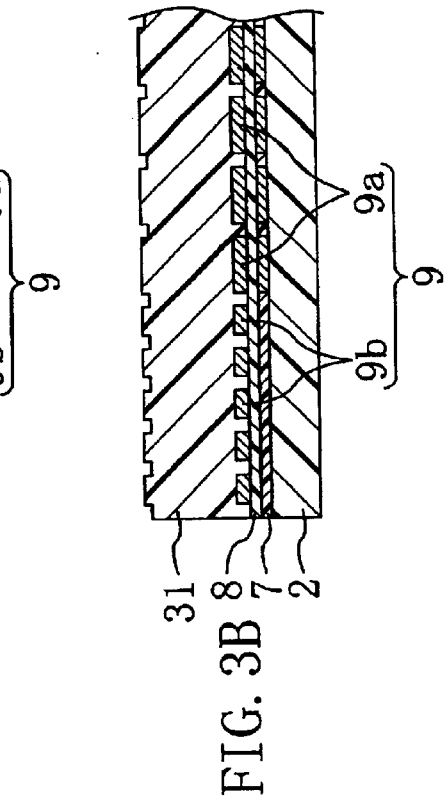

Then, a liquid resin material containing a photosensitizer (negative type resist) is applied on the overcoat 8 and the first electrodes 9 by a spinner, and then pre-baked, as illustrated in FIG. 3B. In this process, a resin layer 31 is formed so as to cover the overcoat 8 and the first electrodes 9. The surface of the resin layer 31 in areas corresponding to the electrodes is higher than that in other areas.

Figure 3C:
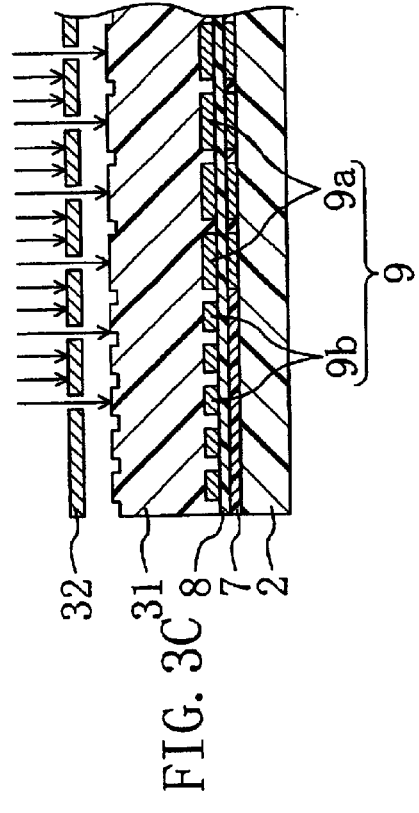

Then, a photomask 32 is positioned above the resin layer 31, and the resin layer 31 is exposed to light coming from above through the photomask 32, as illustrated in FIG. 3C. In this process, portions of the resin layer 31 that are not covered by the photomask 32 are exposed to light and cured. The photomask 32 includes a large number of square-shaped holes having the same shape as the cross section of the columnar spacers 13. The square-shaped holes are arranged across the entire area including the display area and the non-display area in a lattice-shaped arrangement pattern such that each columnar spacer 13 is located at the center of one pixel 14.

Then, the resin layer 31 is developed by a developer, and the unexposed portions thereof are removed, thereby leaving columnar spacer precursors 33 on the first substrate 2, as illustrated in FIG. 3D.

Finally, the columnar spacer precursors 33 are baked so as to form the columnar spacers 13, as illustrated in FIG. 3E.

With such a method for forming the columnar spacers 13, it is not necessary to form, in separate processes, different types of columnar spacers 13 in the display area and in the non-display area, and the columnar spacers 13 of the same shape can be formed simultaneously in a uniform pattern across the entire area including the display area and the non-display area, thereby reducing the number of process steps for forming the columnar spacers 13 and thus improving the productivity. Moreover, only one process is required for forming the columnar spacers 13, thereby suppressing the deterioration of the first substrate 2 due to the process. Furthermore, the amount of material to be consumed for forming the columnar spacers 13 is reduced, thereby reducing the cost.

Moreover, the first substrate 2 is made of a plastic, and thus expands and contracts due to a temperature change by a greater amount as compared to a substrate made of glass. Therefore, the positions of the columnar spacers 13 formed on the first substrate 2 can be easily shifted, whereby the formation of the columnar spacers 13 requires a precisely-controlled process in a case where the columnar spacers 13 are provided within inter-electrode gaps in the display area. In the present embodiment described above, however, the columnar spacers 13 are provided on electrodes that occupy significantly greater areas. Therefore, such a precisely-controlled process is not necessary for forming the columnar spacers 13.

The liquid crystal display device 1 described above, when incorporated together with other components, provides a liquid crystal display apparatus having a good display quality even in the peripheral portion of the display area.

Note that while an STN liquid crystal display device has been described in the embodiment above, the present invention is not limited thereto. Alternatively, the present invention may be applied to an active matrix type liquid crystal display device including a TFT (Thin Film Transistor) liquid crystal display device, other passive matrix type liquid crystal display devices including a TN (Twisted Nematic) liquid crystal display device and a liquid crystal display device using a ferroelectric liquid crystal material, or a plasma-addressed liquid crystal display device. The present invention is particularly advantageous for a liquid crystal display device using a ferroelectric liquid crystal material, which has a very small cell gap and thus has very high requirements on the uniformity of the cell gap. Note that in the case of a plasma-addressed liquid crystal display device, one of the pair of substrates is provided by an intermediate dielectric layer.

While the pixels 14 are arranged in a lattice-shaped matrix pattern in the embodiment described above, the present invention is not limited thereto. Alternatively, the pixels 14 may be arranged in other matrix patterns such as a delta-shaped arrangement.

While one columnar spacer 13 is provided for each pixel 14 in the display area in the embodiment described above, the present invention is not limited thereto. Alternatively, two or more columnar spacers may be provided for each pixel.

While the first and second substrates 2 and 3 are made of a plastic in the embodiment described above, the present invention is not limited thereto. Alternatively, the substrates may be made of a glass.

While the columnar spacers 13 are provided in the non-display area in the arrangement pattern as in the display area in the embodiment described above, the present invention is not limited thereto. Alternatively, the columnar spacers may be intentionally positioned on the peripheral electrodes in the non-display area.

While the columnar spacers 13 each have a square-shaped cross section in the embodiment described above, the present invention is not limited thereto. Alternatively, the columnar spacers may have a circular cross section, for example.

While the columnar spacers 13 are formed by using a negative type resist in the embodiment described above, the present invention is not limited thereto. Alternatively, a positive type resist may be used.

Experiments that were actually performed will now be described.

(Experiments With Glass Substrate)

<Samples Used in Experiments>

Sample 1

Sample 1 is a liquid crystal display device that is structurally the same as that of the embodiment described above, except that the first and second substrates are made of a glass. In Sample 1, each columnar spacer is formed in a square pillar shape having a square-shaped cross section each side of which is 10 µm long, and the height of the columnar spacer is set so that the cell gap is 6 µm. The columnar spacers are arranged at a pitch of 261 µm in the direction in which the first display electrode extends and at a pitch of 90 µm in the direction in which the second display electrode extends (see FIG. 2). The interval between the first peripheral electrodes is 15 μm. The columnar spacers are formed by baking columnar spacer precursors at a temperature of 230° C.

Sample 2

Sample 2 is a liquid crystal display device that is structurally the same as that of Sample 1, except that the columnar spacers are provided within gaps between the first display electrodes.

Sample 3

Sample 3 is a liquid crystal display device that is structurally the same as that of Sample 1, except that plastic bead spacers having a diameter of 6 μm are used instead of columnar spacers.

Sample 4

Sample 4 is a liquid crystal display device that is structurally the same as that of Sample 1, except that the columnar spacers are provided only in the display area without providing the columnar spacers in the non-display area.

Sample 5

Sample 5 is a liquid crystal display device that is structurally the same as that of Sample 1, except that the columnar spacers are formed after forming the first alignment film on the first electrode, i.e., the columnar spacers are provided on the first alignment film and thus the surface of the columnar spacers is not covered by the first alignment film.

<Method of Experiment>

Cell Gap Variations

For each of Samples 1 to 4, the retardation value was measured at eight measurement points that were arranged in a line starting from the non-display area in the vicinity of a sealed portion at the center of the side edge of the device toward the center of the device, and the retardation value for each measurement point was divided by the birefringence of the liquid crystal layer so as to obtain the cell gap at the measurement point. Moreover, each of Samples 1 to 4 was actually operated to display an image thereon and the display quality was evaluated.

Display quality in presence/absence of first alignment film on surface of columnar spacers Each of Samples 1 and 5 was actually operated to display an image thereon and the display quality was evaluated.

Adhesion of Columnar Spacers

For each of Samples 1 and 2, the development time in the process of forming the columnar spacers was changed to different values of 30 sec, 40 sec, 50 sec, 60 sec, 70 sec, 80 sec and 90 sec, and the samples were examined as to whether there was a peel-off of the columnar spacers after the development. In this experiment, the development temperature was 25° C.

<Results of Experiment>

Cell Gap Variations

Figure 4:
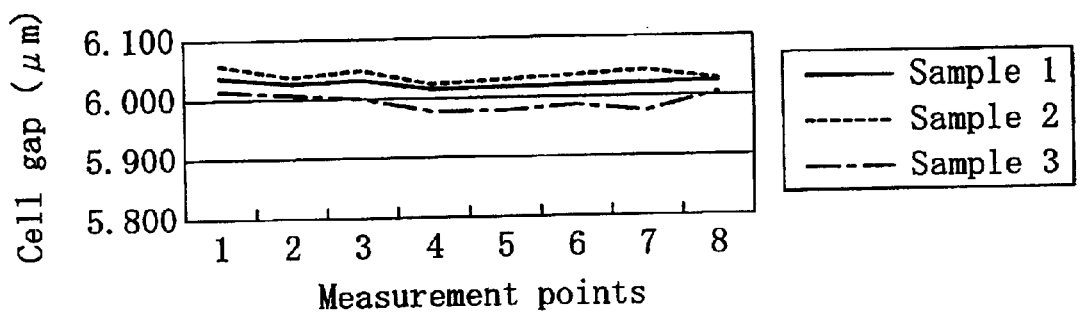
FIG. 4 is a graph illustrating the change in the cell gap for each of Samples 1 to 3.
Figure 5:
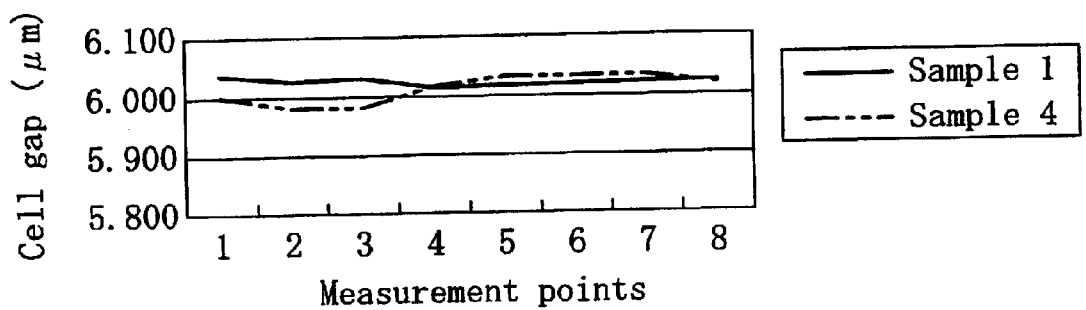
FIG. 5 is a graph illustrating the change in the cell gap for each of Samples 1 and 4.

FIG. 4 shows the change in the cell gap through the eight measurement points for each of Samples 1 to 3. TABLE 1 below shows the average value and the standard deviation σ (variations) of the cell gap for each of Samples 1 to 3. FIG. 5 shows the change in the cell gap through the eight measurement points for each of Samples 1 and 4.

TABLE 1

|  | Cell gap (μm) | Standard deviation σ (variations) |
|---|---|---|
| Sample 1 | 6.024 | 0.005 |
| Sample 2 | 6.036 | 0.012 |
| Sample 3 | 5.994 | 0.015 |

A comparison between Sample 1 and Sample 2 shows that Sample 1 has relatively small cell gap variations, whereas Sample 2 has large cell gap variations in the area extending from the vicinity of the sealed portion to the display area (measurement points 1 to 4). This is believed to be for the following reason. In Sample 1, the columnar spacers 13 are provided on the electrodes 9a and 9b both in the display area and in the non-display area, whereby there is substantially no difference in the height of the top surface position of the columnar spacers 13 between the display area and the non-display area, as illustrated in FIG. 6B. In contrast, in Sample 2, the columnar spacers 13 are provided within the gaps between the first display electrodes 9a in the display area, whereas the columnar spacers 13 are provided on the first peripheral electrodes 9b in the non-display area, thereby creating a difference between the height of the top surface position of the columnar spacers 13 in the display area and that in the non-display area, which results in a cell gap difference, as illustrated in FIG. 6A. As a result, while Sample 1 had a good display quality in the peripheral portion of the display area, Sample 2 had a display non-uniformity in the peripheral portion of the display area.

A comparison between Sample 1 and Sample 3 shows that Sample 1 has relatively small cell gap variations, whereas Sample 3 has large and sharp cell gap variations. This is believed to be for the following reason. In Sample 1, the columnar spacers are arranged uniformly, whereas Sample 3 has a non-uniform distribution of the plastic bead spacers. As a result, while Sample 1 had a good display quality in the peripheral portion of the display area, Sample 3 had a display non-uniformity not only in the peripheral portion of the display area, but also in the display area.

A comparison between Sample 1 and Sample 4 shows that although the cell gap does not substantially change in the display area (measurement points 4 to 8) for both samples, the cell gap of Sample 4 in the non-display area is substantially reduced from that in the display area, while the cell gap of Sample 1 in the non-display area is as stable as in the display area. This is because the columnar spacers are not provided in the non-display area in Sample 4, while the columnar spacers are provided uniformly both in the display area and in the non-display area in Sample 1. As a result, while Sample 1 had a good display quality in the peripheral portion of the display area, Sample 4 had a display non-uniformity in the peripheral portion of the display area.

Display quality in presence/absence of first alignment film on surface of columnar spacers TABLE 2 below shows the display quality evaluation for Samples 1 and 5, wherein "○" means "good", and "Δ" means "display non-uniformity observed".

TABLE 2

|  | Display quality |
|---|---|
| Sample 1 | ○ |
| Sample 5 | Δ |

The display performance of Sample 1 was compared with that of Sample 5. In Sample 1, the display quality was good with the liquid crystal molecules being properly oriented even in areas around the columnar spacers, whereas in Sample 5, the orientation of the liquid crystal molecules was disturbed and light leakage was observed in areas around the columnar spacers. It is believed that the light leakage occurs in Sample 5 because the surface of the columnar spacers is not covered by an alignment film in Sample 5, while it is covered by an alignment film in Sample 1, though the mechanism thereof is not clear. It is believed that Sample 5 had a display non-uniformity because the surface of the first alignment film was damaged by the developer used in the process of forming the columnar spacers.

Adhesion of Columnar Spacers

TABLE 3 below shows the presence/absence of a peel-off of the columnar spacers for various development times for each of Samples 1 and 2, wherein "○" means "no peel-off observed", and "X" means "peel-off observed".

TABLE 3

| | Development time (sec) | | | | | | |
|---|---|---|---|---|---|---|---|
| | 30 | 40 | 50 | 60 | 70 | 80 | 90 |
| Sample 1 | ○ | ○ | ○ | ○ | ○ | ○ | X |
| Sample 2 | ○ | ○ | ○ | X | X | X | X |

The adhesion of the columnar spacers of Sample 1 was compared with that of Sample 2. In Sample 1, no peel-off of the columnar spacers occurred until the development time was increased to 80 sec, whereas in Sample 2, the peel-off of the columnar spacers started to occur at the development time of 60 sec. This is believed to be for the following reason. In Sample 1, the columnar spacers are provided on the electrodes that have minute surface irregularities, thereby increasing the contact area therebetween and thus strengthening the adhesion therebetween, whereas in Sample 2, the columnar spacers are provided on the flat overcoat and can thus be more easily peeled off as compared to Sample 1.

(Experiments With Plastic Substrate)

<Samples Used in Experiments>

Sample 6

Sample 6 is a liquid crystal display device that is structurally the same as that of Sample 1, except that the first and second substrates are made of a plastic. In the process of forming the columnar spacers, the columnar spacers were formed by baking columnar spacer precursors at a temperature of 150° C. The process of forming the columnar spacers was performed on a mother substrate before it is cut into the first substrate. As illustrated in FIG. 7, a mother substrate 40 and the photomask 32 were aligned with each other by aligning the center of each side edge of the mother substrate 40 with that of the photomask 32, so as to reduce the influence of the expansion/contraction of the mother substrate 40. The size of the mother substrate 40 was 420 mm by 300 mm.

Sample 7

Sample 7 is a liquid crystal display device that is structurally the same as that of Sample 6, except that the columnar spacers are provided within the gaps between the first display electrodes (i.e., structurally the same as Sample 2 except that the first and second substrates are made of a plastic).

Sample 8

Sample 8 is a liquid crystal display device that is structurally the same as that of Sample 6, except that plastic bead spacers having a diameter of 6 µm are used instead of columnar spacers (i.e., structurally the same as Sample 3 except that the first and second substrates are made of a plastic).

<Method of Experiment>

Expansion of Substrate

The expansion of the plastic mother substrate when exposed to light during the process of forming the columnar spacers was measured. As illustrated in FIG. 8, the measurement was performed with respect to the broken line as a reference and at three different points designated as "A", "B" and "C" starting from the point closest to the center of the mother substrate 40, so as to obtain the amount of displacement in the X direction and that in the Y direction for each of the measurement points.

Columnar Spacer Placement Percentage

For each of Samples 6 and 7, the display area was divided into a central portion and a peripheral portion, and the columnar spacers were sampled in each of the central portion and the peripheral portion. For Sample 6, the number of columnar spacers that were provided on the first display electrodes was measured, and the percentage of such columnar spacers was calculated. For Sample 7, the number of columnar spacers that were provided within the inter-electrode gaps was measured, and the percentage of such columnar spacers was obtained.

Cell Gap Variations

For each of Samples 6 to 8, the cell gap variations were obtained as for Samples 1 to 3.

<Results of Experiment>

Expansion of Substrate

TABLE 4 below shows the amount of displacement in the X direction and that in the Y direction for each of the measurement points A, B and C.

TABLE 4

| | | A | B | C |
|---|---|---|---|---|
| Amount of displacement (µm) | X direction | 0.2 | 1.2 | 3.3 |
| | Y direction | 0.3 | 2.6 | 10.2 |

As can be seen from TABLE 4, the mother substrate expands more in the Y direction than in the X direction. Particularly, a significant amount of displacement (10.2 µm) is observed for the expansion of the mother substrate in the Y direction at the measurement point C, in the vicinity of the periphery of the mother substrate.

Columnar Spacer Placement Percentage

TABLE 5 below shows the columnar spacer placement percentage in the central portion of the display area and that in the peripheral portion of the display area for each of Samples 6 and 7. Note that the placement percentage is the percentage of columnar spacers that are placed on the electrodes in Sample 6, whereas it is the percentage of columnar spacers that are placed within the inter-electrode gaps in Sample 7.

TABLE 5

| | Columnar spacer placement percentage (%) | | |
|---|---|---|---|
| | Central portion | Peripheral portion | Average value |
| Sample 6 | 100.0 | 100.0 | 100.0 |
| Sample 7 | 100.0 | 25.4 | 62.7 |

A comparison between Samples 6 and 7 shows that in Sample 6, 100% of the columnar spacers are placed on the first display electrodes both in the central portion of the display area and in the peripheral portion of the display area, whereas in Sample 7, although 100% of the columnar spacers are placed within the inter-electrode gaps in the central portion, the percentage is significantly low, i.e., 25.4%, in the peripheral portion. This indicates that since the first substrate made of plastic has substantial expansion/contraction, the positions of the columnar spacers can be easily shifted, whereby while it is possible to place all the columnar spacers on the electrodes, which occupy large areas, it is difficult to place the columnar spacers within the inter-electrode gaps, which occupy small areas.

Cell Gap Variations

TABLE 6 below shows the average value and the standard deviation (variations) of the cell gap for each of Samples 6 to 8.

TABLE 6

| | Cell gap ($\mu$m) | Standard deviation $\sigma$ (variations) |
|---|---|---|
| Sample 6 | 5.989 | 0.011 |
| Sample 7 | 5.953 | 0.018 |
| Sample 8 | 5.994 | 0.023 |

It can be seen that Samples 6 to 8 have a similar relationship with one another to that of Samples 1 to 3 using a glass substrate, which is shown in TABLE 1, with respect to the cell gap and the cell gap variations.

It can also be seen that Samples 6 to 8 have slightly greater cell gap variations as compared to the other samples using a glass substrate. It is believed that this is because the first substrate has a poor dimensional stability, which can be seen from that fact that the columnar spacers are placed on the first display electrodes in the peripheral portion of the display area in Sample 7.

(Experiments With Columnar Spacers of Different Shapes and Sizes)

<Samples Used in Experiments>

Sample 9

Sample 9 is a liquid crystal display device that is structurally the same as that of Sample 1, except that the columnar spacer has a square-shaped cross section each side of which is 5 $\mu$m long.

Sample 10

Sample 10 is a liquid crystal display device that is structurally the same as that of Sample 1, except that the columnar spacer has a circular cross section whose diameter is 5 $\mu$m long.

Sample 11

Sample 11 is a liquid crystal display device that is structurally the same as that of Sample 1.

Sample 12

Sample 12 is a liquid crystal display device that is structurally the same as that of Sample 1, except that the columnar spacer has a circular cross section whose diameter is 6 $\mu$m long.

Sample 13

Sample 13 is a liquid crystal display device that is structurally the same as that of Sample 1, except that the columnar spacer has a square-shaped cross section each side of which is 50 $\mu$m long.

Sample 14

Sample 14 is a liquid crystal display device that is structurally the same as that of Sample 1, except that the columnar spacer has a circular cross section whose diameter is 50 $\mu$m long.

Sample 15

Sample 15 is a liquid crystal display device that is structurally the same as that of Sample 1, except that the columnar spacer has a square-shaped cross section each side of which is 60 $\mu$m long.

Sample 16

Sample 16 is a liquid crystal display device that is structurally the same as that of Sample 1, except that the columnar spacer has a circular cross section whose diameter is 60 $\mu$m long.

Sample 17

Sample 17 is a liquid crystal display device that is structurally the same as that of Sample 1, except that no columnar spacer is provided.

Sample 18

Sample 18 is a liquid crystal display device that is structurally the same as that of Sample 9, except that the interval between the first peripheral electrodes is 20 $\mu$m.

Sample 19

Sample 19 is a liquid crystal display device that is structurally the same as that of Sample 10, except that the interval between the first peripheral electrodes is 20 $\mu$m.

Sample 20

Sample 20 is a liquid crystal display device that is structurally the same as that of Sample 11, except that the interval between the first peripheral electrodes is 20 $\mu$m.

Sample 21

Sample 21 is a liquid crystal display device that is structurally the same as that of Sample 12, except that the interval between the first peripheral electrodes is 20 $\mu$m.

<Method of Experiment>

Damage on Columnar Spacers During Rubbing Treatment

For each of Samples 9 to 16, the number of columnar spacers that remained after the rubbing treatment on the first alignment film was measured, and the percentage thereof was calculated.

Phase Difference and Display Quality

For each of Samples 9 to 17, the phase difference (retardation) of the first alignment film was measured at a plurality of measurement points after the rubbing treatment, and the average value and the standard deviation $\sigma$ (variations) were calculated.

Moreover, each of Samples 9 to 17 was actually operated to display an image thereon and the display quality was evaluated.

Columnar Spacer Placement Percentage

For each of Samples 9 to 12 and 18 to 21, the columnar spacers located within the gaps between the first peripheral electrodes in the non-display area were sampled, and the number of columnar spacers that are provided within the inter-electrode gaps was measured so as to calculate the percentage thereof.

<Results of Experiment>

Damage on Columnar Spacers During Rubbing Treatment

TABLE 7 below shows the survival percentage of columnar spacers after the rubbing treatment for each of Samples 9 to 16.

TABLE 7

|  | Survival percentage (%) |
|---|---|
| Sample 9 | 27 |
| Sample 10 | 18 |
| Sample 11 | 100 |
| Sample 12 | 100 |
| Sample 13 | 100 |
| Sample 14 | 100 |
| Sample 15 | 100 |
| Sample 16 | 100 |

As can be seen from TABLE 7, the survival percentage of the columnar spacers is very low in Samples 9 and 10, whereas it is 100% in Samples 11 to 16, indicating that the number of columnar spacers that are peeled off and damaged during the rubbing treatment is significantly increased when the minimum outside diameter of the columnar spacers is smaller than 6 $\mu$m.

Phase Difference and Display Quality

TABLE 8 below shows the average value and the standard deviation $\sigma$ (variations) of the retardation for each of Samples 9 to 17. TABLE 9 shows the display quality of each of Samples 9 to 17, wherein "⊙" means "good", "○" means "slight display non-uniformity observed", "Δ" means "significant display non-uniformity observed", and "▲" means "roughness (many bright points) observed".

TABLE 8

|  | Phase difference (retardation: RE) | Standard deviation $\sigma$ (variations) |
|---|---|---|
| Sample 9 | 0.51 | 0.10 |
| Sample 10 | 0.57 | 0.09 |
| Sample 11 | 0.55 | 0.09 |
| Sample 12 | 0.60 | 0.11 |
| Sample 13 | 0.51 | 0.10 |
| Sample 14 | 0.57 | 0.09 |
| Sample 15 | 0.21 | 0.45 |
| Sample 16 | 0.33 | 0.38 |
| Sample 17 | 0.62 | 0.09 |

TABLE 9

|  | Display quality |
|---|---|
| Sample 9 | ⊙ |
| Sample 10 | ⊙ |
| Sample 11 | ⊙ |
| Sample 12 | ⊙ |
| Sample 13 | ○ |
| Sample 14 | ○ |
| Sample 15 | Δ |
| Sample 16 | ▲ |
| Sample 17 | ⊙ |

As can be seen from TABLE 8, Samples 9 to 14 have phase difference (retardation) values close to that of Sample 17, which has no columnar spacer, and have similar levels of retardation variations, whereas Samples 15 and 16 have smaller phase difference values with large variations. This is believed to be for the following reason. In Samples 9 to 14, the minimum outside diameter of the columnar spacers is 50 $\mu$m or less, and the rubbing treatment on the first alignment film is performed without being hindered by the presence of the columnar spacers, whereas in Samples 15 and 16, the minimum outside diameter of the columnar spacers is as large as 60 $\mu$m, and the rubbing treatment will be insufficient, particularly in an area around the base of each columnar spacer, by being hindered by the presence of the columnar spacers.

As can be seen from TABLE 9, the display quality decreases as the spacer size increases for Samples 9 to 14, and Samples 13 and 14 have only a slight display non-uniformity whereas Sample 15 has a significant display non-uniformity and Sample 16 even has a roughness. This is believed to be due to the difference between the phase difference (retardation) of the first alignment film of Samples 9 to 14 and that of Samples 15 and 16.

Columnar Spacer Placement Percentage

TABLE 10 below shows the percentage of columnar spacers that are placed within inter-electrode gaps for each of Samples 9 to 12 and 18 to 21.

TABLE 10

|  | Columnar spacer placement percentage (%) |
|---|---|
| Sample 9 | 97 |
| Sample 10 | 100 |
| Sample 11 | 43 |
| Sample 12 | 54 |
| Sample 18 | 100 |
| Sample 19 | 100 |
| Sample 20 | 100 |
| Sample 21 | 100 |

As can be seen from TABLE 10, for the samples in which the inter-electrode interval is 15 $\mu$m, substantially all of the columnar spacers are placed within the inter-electrode gaps in Samples 9 and 10, whereas the percentage is about one half thereof in Samples 11 and 12. This indicates that most of the columnar spacers can be placed within the inter-electrode gaps if the inter-electrode interval is set to be about 15 $\mu$m and the minimum outside diameter of the columnar spacers is set to be about 5 $\mu$m. However, columnar spacers of such a size can possibly be peeled off and damaged during the rubbing treatment, as described above.

It can also be seen that for the samples in which the inter-electrode interval is 20 $\mu$m, substantially all of the columnar spacers are placed within the inter-electrode gaps in any of Samples 18 to 21. This indicates that most of the columnar spacers can be placed within the inter-electrode gaps without being peeled off and damaged during the rubbing treatment if the inter-electrode interval is set to be about 20 $\mu$m and the minimum outside diameter of the columnar spacers is set to be about 6 $\mu$m. However, it is practically difficult to ensure such an interval as great as about 20 $\mu$m between the first peripheral electrodes.

It can also be seen that in Samples 11 and 12, substantially one half of the columnar spacers located along the inter-electrode gaps are placed within the inter-electrode gaps with the rest of the columnar spacers being placed on the first peripheral electrodes, whereas in Samples 20 and 21, all of the columnar spacers located along the inter-electrode gaps are placed within the inter-electrode gaps. This indicates that it is possible to effectively place the columnar spacers on the first peripheral electrodes by setting the interval between the first peripheral electrodes to be smaller than 15 $\mu$m, while setting the minimum outside diameter of the columnar spacers to be 6 $\mu$m or more.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A liquid crystal display device having a display area for displaying an image and a non-display area adjacent to the display area the liquid crystal display device, comprising:
   a first substrate;
   a second substrate opposing the first substrate via a large number of columnar spacers therebetween, the columnar spacers being fixed on the first substrate; and
   a liquid crystal layer provided between the first substrate and the second substrate, wherein:
      in the display area, a plurality of display electrodes that are used when applying a voltage across the liquid crystal layer are provided at an interval on one side of the first substrate that is closer to the liquid crystal layer;
      in the non-display area, a plurality of peripheral electrodes are provided with substantially no interval therebetween on the side of the first substrate that is closer to the liquid crystal layer; and
      the large number of columnar spacers on the first substrate are all of the same size and are arranged in a uniform pattern across an entire area including the display area and the non-display area; and
      among the large number of columnar spacers, the columnar spacers in the display area are provided on the display electrodes and the columnar spacers that define a thickness of the liquid crystal layer in the non-display area are provided on the peripheral electrodes.

2. The liquid crystal display device of claim 1, wherein:
   second peripheral electrodes are provided in the non-display area on one side of the second substrate that is closer to the liquid crystal layer; and
   40% or more of the columnar spacers in the non-display area are interposed between the peripheral electrodes on the first substrate and the second peripheral electrodes on the second substrate.

3. The liquid crystal display device of claim 1, wherein a minimum outside diameter of the columnar spacers is 6 to 50 μm.

4. The liquid crystal display device of claim 1, wherein the peripheral electrodes have areas where an inter-electrode interval therebetween is smaller than 15 μm.

5. The liquid crystal display device of claim 1, wherein the non-display area is provided so as to surround the display area, and the plurality of peripheral electrodes in the non-display area are provided so as to surround the display electrodes in the display area.

6. The liquid crystal display device of claim 1, wherein the first substrate is made of a plastic.

7. The liquid crystal display device of claim 1, wherein the columnar spacers in the display area are directly fixed on the display electrodes, and the columnar spacers in the non-display area are directly fixed on the peripheral electrodes.

8. The liquid crystal display device of claim 1, wherein a display mode is an STN mode.

9. A liquid crystal display apparatus, comprising a liquid crystal display device having display area for displaying an image and a non-display area adjacent to the display area, the liquid crystal display device including:
   a first substrate;
   a second substrate opposing the first substrate via a large number of columnar spacers therebetween, the columnar spacers being fixed on the first substrate;
   a liquid crystal layer provided between the first substrate and the second substrate; wherein:
      in the display area a plurality of display electrodes that are used when applying a voltage across the liquid crystal layer are provided at an interval on one side of the first substrate that is closer to the liquid crystal layer;
      in the non-display area, a plurality of peripheral electrodes are provided with substantially no interval therebetween on the side of the first substrate that is closer to the liquid crystal layer;
      the large number of columnar spacers on the first substrate are all of the same size and are arranged in a uniform pattern across an entire area including the display area and the non-display area; and
      among the large number of columnar spacers, the columnar spacers in the display area are provided on the display electrodes and the columnar spacers that define a thickness of the liquid crystal layer in the non-display area are provided on the peripheral electrodes.

10. The liquid crystal display device of claim 1, wherein the columnar spacers in the display area are arranged so as to form a first uniform pattern across an entirety of the display area and the columnar spacers in the non-display area are arranged so as to form a second uniform pattern across an entirety of the non-display area.

11. The liquid crystal display device of claim 10, wherein the second uniform pattern is established such that each of the columnar spacers in the non-display area are provided on each of the peripheral electrodes.

12. A liquid crystal display device having a display area for displaying an image, and a non-display area adjacent to the display area, the liquid crystal display device comprising:
   a first substrate;
   a second substrate opposing the first substrate;
   a liquid crystal layer provided between the first substrate and the second substrate;
   a large number of columnar spacers being provided between the first and second substrates, where a plurality or more of the large number of columnar spacers are configured and arranged respectively in each of the display area and the non-display area between the first and second substrates so as to define a thickness of the liquid crystal layer;
   a plurality of display electrodes that are used when applying a voltage across the liquid crystal layer being provided in the display area and at an interval on one side of the first substrate that is closer to the liquid crystal layer;
   a plurality of peripheral electrodes being provided in the non-display area and with substantially no interval therebetween on the side of the first substrate that is closer to the liquid crystal layer;
   wherein the large number of columnar spacers on the first substrate are all of the same size and are arranged in a uniform pattern across an entire area including the display area and the non-display area;

wherein the plurality or more of columnar spacers in the display area are arranged so the plurality or more of columnar spacers are provided on the display electrodes; and wherein 40% or more of the plurality or more of columnar spacers in the non-display area are are provided on the peripheral electrodes.

13. The liquid crystal display device of claim 12, wherein the columnar spacers in the display area and the columnar spacers in the non-display area are arranged so as to form a uniform pattern respectively across an entirety of each of the display area and the non-display area.

14. The liquid crystal display device of claim 12, wherein the columnar spacers in the display area are arranged so as to form a first uniform pattern across an entirety of the display area and the columnar spacers in the non-display area are arranged so as to form a second uniform pattern across an entirety of the non-display area.

15. The liquid crystal display device of claim 14, wherein the second uniform pattern is established such that each of the plurality or more of columnar spacers in the non-display area are provided on each of the peripheral electrodes.

16. The liquid crystal display device of claim 12, wherein the columnar spacers in the non-display area are arranged so as to form a uniform pattern across an entirety of the non-display area, the uniform pattern for the non-display area being established such that each of the more than a plurality of columnar spacers in the non-display area are provided on each of the peripheral electrodes.

17. The liquid crystal display device of claim 12, wherein the plurality or more of columnar spacers in the non-display area are arranged so each of the plurality or more of columnar spacers are provided on each of the peripheral electrodes in the non-display area.

* * * * *